United States Patent
Rebs et al.

(10) Patent No.: US 9,415,430 B2
(45) Date of Patent: Aug. 16, 2016

(54) ROLL STAND FOR ROLLING METALLIC STRIPS AND ROLL OR CYLINDER FOR A ROLL STAND OF THIS TYPE

(75) Inventors: Alexander A. Rebs, Ratingen (DE); Udo Davids, Bayreuth (DE); Ralf Seidel, Dillenburg (DE)

(73) Assignees: SMS Siemag AG, Düsseldorf (DE); REBS Zentralschmiertechnik GmbH, Ratingen (DE)

( * ) Notice: Subject to any disclaimer, the term of this patent is extended or adjusted under 35 U.S.C. 154(b) by 79 days.

(21) Appl. No.: 12/529,687

(22) PCT Filed: Sep. 12, 2008

(86) PCT No.: PCT/EP2008/062178
§ 371 (c)(1),
(2), (4) Date: Jan. 28, 2010

(87) PCT Pub. No.: WO2009/034173
PCT Pub. Date: Mar. 19, 2009

(65) Prior Publication Data
US 2010/0162781 A1    Jul. 1, 2010

(30) Foreign Application Priority Data

Sep. 12, 2007  (DE) .......................... 10 2007 043 403
Jun. 10, 2008  (DE) .......................... 20 2008 007 718

(51) Int. Cl.
*B21B 31/07*   (2006.01)
*F16C 13/02*   (2006.01)
(Continued)

(52) U.S. Cl.
CPC .............. *B21B 31/076* (2013.01); *F16C 13/02* (2013.01); *F16C 19/388* (2013.01); *F16C 33/6662* (2013.01); *F16N 7/32* (2013.01); *F16N 25/00* (2013.01); *B21B 27/08* (2013.01)

(58) Field of Classification Search
CPC ........ B21B 31/18; B21B 31/07; B21B 31/00; B21B 45/02; B21B 27/06; B21B 27/08; B21B 28/00; B21B 31/076; B21B 31/078; B21B 35/147; B21B 45/0239
USPC .......... 72/41, 42, 43, 44, 249, 252.5, 6.2, 8.4, 72/236; 492/1, 2, 3; 184/7.1, 8, 55.1, 55.2
See application file for complete search history.

(56) References Cited

U.S. PATENT DOCUMENTS 2,018,055 A * 10/1935 Dahlstrom .................... 384/419
2,312,648 A *  3/1943 Jones ............................. 72/248
(Continued)

FOREIGN PATENT DOCUMENTS

EP    0 010 269    4/1980
EP    0047234      3/1982
(Continued)

OTHER PUBLICATIONS

International Search Report for International Application No. PCT/EP2008/062178.

*Primary Examiner* — Shelley Self
*Assistant Examiner* — Pradeep C Battula
(74) *Attorney, Agent, or Firm* — The Webb Law Firm

(57) ABSTRACT

A roll stand for rolling metallic strips includes at least one roll or cylinder which is respectively mounted in a mounting on rolling bearings in the region of its end journals, and at least one distributing device for distributing a lubricant-gas flow. The roll stand according to the invention makes it easily possible in an operationally reliable manner to supply a rolling bearing, provided for mounting a roll or cylinder, with a precisely determined amount of lubricant. This is achieved according to the invention in that a connecting channel for the transport of a lubricant-gas flow to or from the distributing device is molded into the roll or cylinder.

20 Claims, 5 Drawing Sheets

(51) Int. Cl.
*F16C 19/38* (2006.01)
*F16C 33/66* (2006.01)
*F16N 7/32* (2006.01)
*F16N 25/00* (2006.01)
*B21B 27/08* (2006.01)

(56) References Cited

U.S. PATENT DOCUMENTS

| | | | | |
|---|---|---|---|---|
| 2,712,967 | A * | 7/1955 | Sutton | 384/473 |
| 3,076,523 | A * | 2/1963 | Fuller | B21B 31/076 184/7.4 |
| 3,298,215 | A * | 1/1967 | Bonhoff | 72/238 |
| 3,306,091 | A * | 2/1967 | Bursk | 72/240 |
| 3,411,333 | A * | 11/1968 | Frankel | 72/45 |
| 3,457,617 | A * | 7/1969 | Noe | B21B 27/05 100/170 |
| 3,604,086 | A * | 9/1971 | Bretschneider | B21B 27/05 100/162 B |
| 4,025,872 | A | 5/1977 | Grayzel | 330/34 |
| 4,217,821 | A * | 8/1980 | Vertegaal et al. | 101/181 |
| 4,242,781 | A * | 1/1981 | Takigawa | F16C 13/026 492/2 |
| 4,452,647 | A * | 6/1984 | Sailas | 148/512 |
| 4,658,620 | A * | 4/1987 | Masui | B21B 1/24 72/234 |
| 4,692,040 | A * | 9/1987 | Ebaugh et al. | 384/484 |
| 4,944,609 | A * | 7/1990 | Salter et al. | 384/118 |
| 5,154,850 | A * | 10/1992 | Deguchi et al. | 510/420 |
| 5,253,733 | A * | 10/1993 | Miyachi | 184/6.26 |
| 5,308,307 | A * | 5/1994 | Morel et al. | 492/1 |
| 5,327,762 | A * | 7/1994 | Nagamine et al. | 72/247 |
| 5,651,410 | A * | 7/1997 | Perry | B21B 27/08 164/428 |
| 5,979,207 | A * | 11/1999 | Seidl et al. | 72/249 |
| 6,062,248 | A * | 5/2000 | Boelkins | 137/118.02 |
| 6,158,263 | A * | 12/2000 | Maeda et al. | 72/237 |
| 6,257,370 | B1 | 7/2001 | Schwarze et al. | 184/55.1 |
| 6,428,212 | B1 * | 8/2002 | Tanaka | B21B 31/076 384/475 |
| 6,557,668 | B2 * | 5/2003 | Rebs, Sr. | 184/55.1 |
| 7,024,899 | B2 * | 4/2006 | Klingen et al. | 72/78 |
| 7,874,192 | B2 * | 1/2011 | Bartlett et al. | 72/201 |
| 7,891,224 | B2 * | 2/2011 | Cooper et al. | 72/243.6 |
| 7,967,056 | B2 * | 6/2011 | Arvedi | 164/471 |
| 8,701,836 | B2 * | 4/2014 | Paluncic | 184/7.4 |

FOREIGN PATENT DOCUMENTS

| | | | | |
|---|---|---|---|---|
| FR | 751197 | * | 8/1933 | B21B 31/076 |
| FR | 751197 A | * | 8/1933 | B21B 31/076 |
| JP | 49146340 | | 4/1973 | |
| JP | 50333 | | 5/1973 | |
| JP | 6117310 A | | 1/1986 | |
| JP | 6210327 | * | 8/1994 | B21B 27/05 |
| JP | 2005-288535 A | | 10/2005 | |
| WO | 97/46825 | | 12/1997 | |

* cited by examiner

ROLL STAND FOR ROLLING METALLIC STRIPS AND ROLL OR CYLINDER FOR A ROLL STAND OF THIS TYPE

CROSS-REFERENCE TO RELATED APPLICATIONS

This application is a National Phase Application of International Application No. PCT/EP2008/062178, filed on Sep. 12, 2008, which claims the benefit of and priority to German patent application no. DE 10 2007 043 403.2-14, filed on Sep. 12, 2007, and German patent application no. DE 20 2008 007 718.4, filed on Jun. 10, 2008. The disclosures of the above applications are incorporated herein by reference in their entirety.

FIELD OF THE INVENTION

The invention relates to a roll stand for rolling metallic strips. Roll stands of this type usually have an operating side from where the roll stand is accessible for carrying out maintenance work, and a drive side on which a drive is provided for driving the roll stand.

BACKGROUND

"Rolls" and "cylinders" of the type under discussion here are usually, in their basic shape, cylindrical rotationally-symmetrical bodies which can be provided with a certain camber or a different specific shaping in order to be able to perform the respective rolling task in the respectively prescribed manner. In this respect, the "rolls" are generally directly coupled with the drive of the roll stand and are actively driven, whereas the "cylinders" are mounted in the roll stand without a direct drive and are only set into rotation during rolling operation due to the rolling contact with a roll or with the material to be rolled.

The problem being considered here arises equally in the case of rolls and cylinders, so that the following explanations apply equally to rolls and cylinders of a roll stand, even if only one of these components is mentioned.

The rolls and cylinders of roll stands are typically mounted in a respective mounting on rolling bearings in the region of their end journals. Said mounting can be formed in each case by a plurality of individual rolling bearings.

Due to the fact that the mountings on rolling bearings have to absorb considerable forces in rolling operation, high demands are imposed on their supply of lubricant. Thus, the respectively used lubricant serves on the one hand to reduce the friction arising in the rolling bearings. At the same time, the lubricant carries away some of the heat which forms in the respective bearing due to the rolling friction which is unavoidable there.

On account of this double function of the lubricant, considerable flows of oil are passed through the rolling bearings of a roll stand during practical rolling operation. This not only involves a costly oil supply for the apparatus, but large quantities of oil also have to be kept circulating, the preparation, stocking and disposal of which also entail a considerable complexity. In addition, in order to avoid leakage flows, extensive measures have to be taken to seal the bearings.

So-called "oil-air lubrications" have proved to be successful as an alternative to lubricating the rolling bearings of roll stands with considerable flows of oil. These oil-air lubrications allow a precisely metered allocation of the respectively required amount of lubricant to the respective lubrication points. The use of oil-air lubrication systems can not only drastically reduce the amount of lubricant kept in circulation, but also the risk of leaks forming and the necessary expense for sealing the bearings is significantly reduced compared to lubrication based on a conventional oil flow.

EP 0 902 868 B1 discloses an apparatus which is particularly suitable for use in roll stands and comparable machines for the uniform division of a lubricant-gas flow into a large number of discharge channels. This known apparatus comprises an inflow bore which branches into a large number of outflow lines. To achieve the uniform distribution, unaffected by gravitational influences, of the gas/lubricant flow while maintaining a turbulent flow in all outflow lines, the inflow bore opens into a distribution chamber which widens in the direction of flow. Configured in the transition region from the inflow bore to the distribution chamber is an encircling tear-of edge and on the wall of the distribution chamber opposite the end of the inflow bore is an impact surface which is aligned concentrically to the end opening of the inflow bore, the diameter of the impact surface being greater than the diameter of the inflow bore. Distributed around the periphery of the impact surface are the inlet openings of the outflow bores.

The assembly of the known apparatus in the bores of a roll stand is particularly simple in that the known distributing device has a tubular housing, on both end faces of which is formed a respective seat, the first seat of which is for receiving an inflow-side connection element and the second is for receiving a second connection element.

Prior apparatus for distributing a lubricant-gas flow are known from U.S. Pat. No. 5,253,733 or EP 0 010 269 B1.

In practice, compressed air is used in distributing devices of the type described above for advancing the respective lubricant and is usually provided in the surroundings of a roll train for rolling metallic strips.

By way of example, when there is only a small amount of space available in the region of the respective roll stand, the refit of already existing roll stands with oil-gas flow lubricating devices of the previously described type has proved to be problematic. Moreover, it is generally required in the case of new constructions that the outlay, required for the supply of lubricant to the rolling bearings, of supply lines and the like is reduced to a minimum, so that the maintenance of the bearing and repairs which may be necessary can easily be carried out.

SUMMARY OF THE INVENTION

Against this background, an aspect of the invention is to provide a roll stand for which it is easily possible in an operationally reliable manner to supply a rolling bearing provided for mounting a roll or cylinder with a precisely determined amount of lubricant.

In general, in an embodiment, the aspect of the invention is provided by a roll stand for rolling metallic strips including at least one roll or cylinder which is respectively mounted in a mounting on rolling bearings in the region of its end journals and at least one distributing device for distributing a lubricant-gas flow, wherein a connecting channel for transporting the lubricant-gas flow to or from the distributing device is molded into the at least one roll or cylinder.

The aspect of the invention is also equally achieved by a roll or cylinder for a roll stand including a first end journal associated with a drive side of the roll stand and a second end journal associated with the operating side of the roll stand, wherein a connecting channel for transporting lubricant-gas flow to or from at least one distributing device is molded into the roll or cylinder.

The invention proposes, for a roll stand for rolling metallic strips which comprises at least one roll or cylinder which is mounted in each case in a mounting in rolling bearings in the region of its end journals, and comprises at least one distributing device for distributing a lubricant-gas flow, molding a connecting channel in the respective roll or cylinder for the feed or discharge of the lubricant-gas flow. Thus, in this way in a roll stand according to the invention, the roll body or cylinder body is itself used to transport lubricant to the lubrication points which are to be respectively supplied with lubricant.

The fundamental advantage of the configuration according to the invention of a roll or cylinder for a roll stand is that no additional lines have to be provided for the supply of lubricant to the bearings to be lubricated in each case on the respective roll stand, which additional lines in practice hinder access to the roll stand and to its individual components and could be damaged due to the rough operating conditions under which roll stands of the type under discussion are used. Instead, in a roll stand according to the invention, the line expense is minimized and the supply line required to supply the bearing points to be lubricated runs in one location, namely through the respective roll or cylinder body, on which damage or another functional disturbance caused by external forces is practically ruled out.

The invention proves to be particularly advantageous when a roll stand according to the invention has, in conformity with the previously known prior art, an operating side from which the roll stand is accessible for assembly and/or maintenance, and a drive side on which a drive is arranged for driving the roll stand and which is avoided as far as possible by the operating personnel due to the increased risk of accidents which exists there and to the poor accessibility. Due to the fact that the supply channel is molded into the respective roll or cylinder and this roll or cylinder can be drawn out of the roll stand or pushed into the roll stand from the operating side, the maintenance of the connecting channel and the supply aggregates connected thereto is also particularly simple. A particularly straightforward accessibility and a correspondingly simple connection possibility of the connecting channel is provided when the connecting channel runs from the end face associated with the operating side to the end face associated with the drive side of the roll or cylinder.

Embodiments according to the invention of a roll stand thus afford significant advantages compared to a supply of the points to be lubricated by means of a separate line system additionally provided on the roll stand. Thus, the invention makes it possible to supply with lubricant the lubrication points of a roll stand with a constructively particularly simple solution, the lubricant being driven by the gas flow to the roll stand and being required for the correct operation of the respective bearing.

Due to the fact that the lubricant-gas flow passing through the connecting channel is substantially uninfluenced by the course and arrangement of the connecting channel and alignment, the manner in which the connecting channel is made in the respective roll or cylinder is only of minor significance for the effects achieved by the invention. The connecting channel provided according to the invention can, however, be made in a roll or cylinder in a particularly straightforward manner if it extends at least substantially coaxially to the rotational axis of the roll or cylinder. In terms of production, this has the advantage that a central arrangement of this type of the connecting channel can be realized in a particularly simple manner, for example by drilling.

In this respect, the connecting channel can be produced in a practical manner by two bores joining one another and extending in the longitudinal direction of the roll or cylinder, of which one bore, starting from one end face, associated for example with the operating side and the other bore, starting from the other end face associated, for example with the drive side, is molded in the cylinder or roll. This production possibility can be realized in practice at a comparatively low cost, especially as no particular demands are imposed on the accuracy with which the two bores join one another. Even certain cracks in the region in which the two bores join one another do not adversely affect the uniformity of the distribution result, as long as the passage of sufficient lubricant and gas flow through the respective channel diameter is ensured in the region where the bores meet.

The invention is particularly suitable for stands which are provided for hot rolling metallic strips at temperatures above 400° C. This applies most particularly for roll stands which are used on their own or as part of a group of stands for hot rolling steel strips. It is precisely with hot rolling stands of this type that the advantages are revealed of a precise lubrication, made easily possible by the invention, of the respective rolling bearings with minimum quantities of lubricant.

Discharge channels which lead in a radial direction to the lubrication points to be supplied in each case can lead out from the central connecting channel. These discharge channels can be allocated the outlets of a distributor positioned in the roll or cylinder.

However, it can also be equally expedient to lead the connecting channel from one end to the other of the respective roll or cylinder and there to direct it to the respective distributor positioned outside the roll or cylinder via suitable connecting elements, which distributor then divides it up to the lubrication points to be supplied.

In order to allow an operationally reliable connection of the connecting channel to the aggregates to be supplied in each case by the connecting channel, said connecting channel can be connected to a central feed device via a supply line which opens into the connecting channel via a rotation-uncoupled connection element inserted in the connecting channel.

It is possible to further simplify the maintenance of a roll stand fitted according to the invention with a distributor for a lubricant-gas flow by molding in at least one of the end journals of the roll or cylinder a seat in which a distributing device is positioned for distributing a lubricant-gas flow to at least one discharge line which leads from the respective seat through the roll or cylinder to the mounting on rolling bearings associated with the respective journal.

The seat is preferably molded in one of the end journals of the respective roll or cylinder, which end journal is mounted in the bearing to be lubricated. Starting from the seat, discharge lines which are likewise molded in the respective roll or cylinder then lead to the respective rolling bearing. The openings of these discharge bores can easily be respectively positioned such that the lubricant issuing therefrom at the optimum location in each case passes into the rolling bearing to be lubricated.

The arrangement according to the invention of the distributors for the lubricant-gas flow supply in the respective journals of a roll or cylinder can thus supply the rolling bearings of the roll stand with a lubricant-gas flow in a particularly simple manner. Complex pipe works which would have to be mounted on the stand or molded into the framework of the roll stand at a considerable expense, are not required. Instead, the invention makes it possible to introduce the elements required for lubricating the respective rolling bearing into a roll or cylinder prefabricated at a location remote from the roll stand.

If required, it is expedient if at least one seat for a respective distributing device is respectively molded into each of the end journals of the respective roll or cylinder. In this case, a particularly simple embodiment is provided if the seats made in the end journals are interconnected by a connecting channel which leads through the respective roll or cylinder.

A connecting channel of this type which passes through the respective roll or cylinder has the fundamental advantage that the distributing devices of both end journals of the respective roll or cylinder can be supplied with the necessary lubricant-gas flow via a central supply connection provided on one end journal. In this respect, the invention makes use of the straightforward possibility of the known distributing devices of using the first distributor not only for dividing up the lubricant flow to the lubrication points directly associated with the respective distributor, but also allocating it to a second distributor. This second distributor operates in this respect as a sub-distributor and distributes the lubricant flow allocated thereto to the lubrication points to which it has been assigned.

With a roll or cylinder according to the invention and a roll stand fitted with a roll or cylinder of this type, the devices, respectively associated with the drive side and the operating side of the roll stand, for distributing the lubricant-gas flow via the connecting channel can be coupled together such that both distributing devices can be supplied centrally by means of a single supply line, the distributing device directly connected to the supply line allocating the required lubricant flow to the distributing device which is not directly connected to the supply line.

For the case that positioned in each end journal of the respective roll or cylinder of the roll stand according to the invention is a lubricant-gas flow distributing device and that these distributing devices are interconnected by a connecting channel, there is thus provided a roll stand or a roll or cylinder intended for a roll stand of this type in which the lubricant-gas flow can be supplied in a particularly straightforward manner.

The latter applies in particular if the distributing devices are supplied from the operating side of the stand. In this case, there arises neither the expense associated with the subsequent assembly of a lubricant-gas flow supply of the rolling bearings associated with the drive side of the roll stand, nor the inconvenience associated with the routine maintenance of these bearings in the prior art.

The distributing device associated with the operating side can be connected in a particularly practical manner to the central lubricant-gas flow supply line when the supply line opens in the respective seat via a rotation-uncoupled connecting element inserted in the respective operating-side seat.

Similar distributing devices can be used for the division of the lubricant-gas flows required respectively on the operating side and on the drive side, when the opening of the seat associated with the drive side of the roll stand is sealed with a stopper.

BRIEF DESCRIPTION OF THE DRAWINGS

The invention will be described in more detail below with reference to drawings illustrating exemplary embodiments. In the schematic drawings.

DETAILED DESCRIPTION

Figure 1:
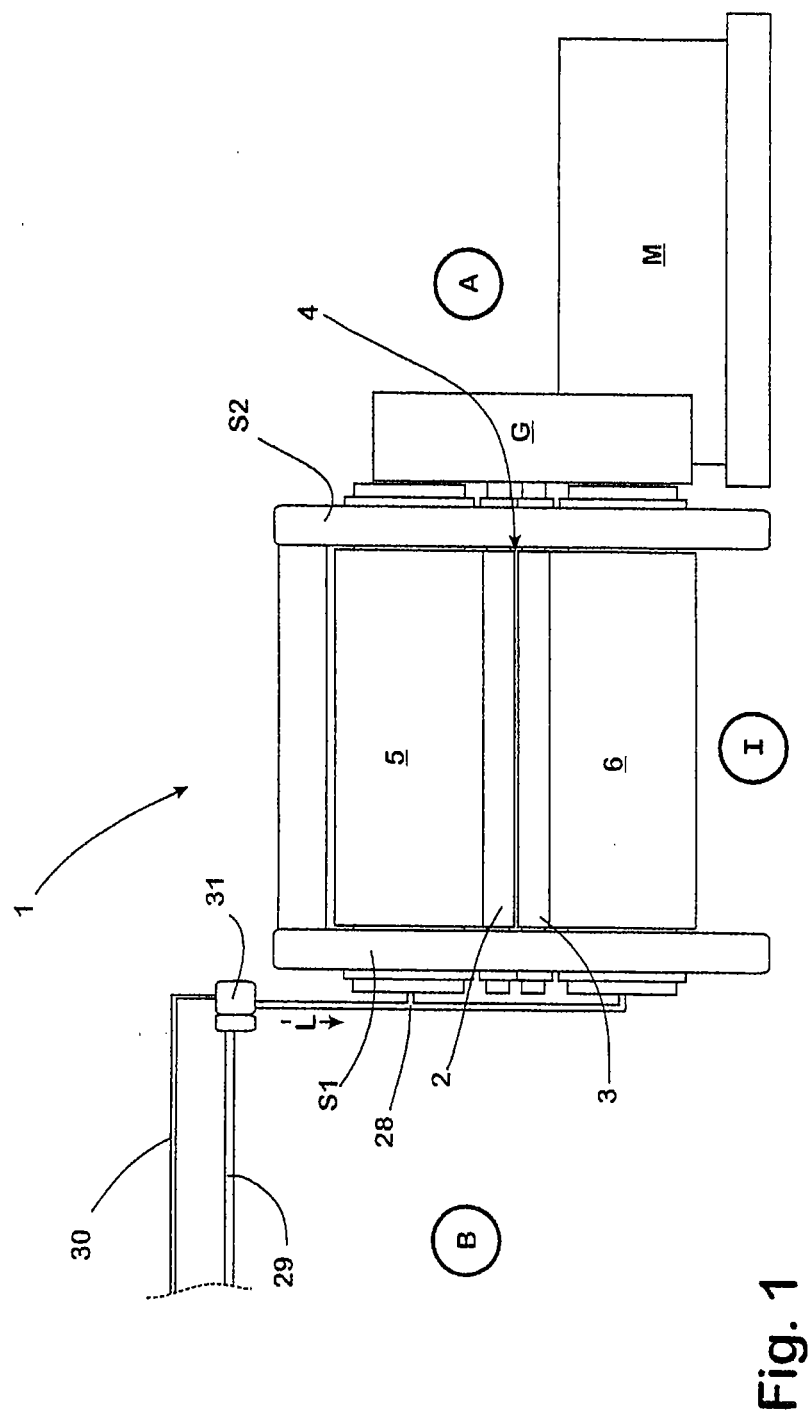
FIG. 1 is a greatly simplified frontal view of a roll stand for hot rolling a steel strip.

The roll stand 1 of the quarto type shown in FIG. 1 has two working rolls 2, 3 which delimit between themselves the roll gap 4 through which the rolling stock passes which is to be respectively rolled. The working rolls 2, 3 are each supported by a back-up roll 5, 6 against the forces which act on them during rolling operation. The axes of rotation of the working rolls and back-up rolls 2, 3, 5, 6 are located in a vertical plane.

Of course, the invention described here can also be used in the same manner or in a correspondingly adapted manner for any other type of roll stand, where the rolling bearings in which the rolls or cylinders of the respective roll stand are mounted have to be lubricated.

An electric drive motor M which is coupled with the working rolls and back-up rolls 2, 3, 5, 6 via a transmission G is provided in a known manner for driving the roll stand 1. In this arrangement, the motor M and transmission G are positioned in extension of the axes of rotation of the working rolls and back-up rolls 2, 3, 5, 6 on the so-called "drive side" A of the roll stand 1, while the opposite side of the roll stand 1, the so-called "operating side" B is freely accessible for maintenance and assembly purposes.

The working rolls and back-up rolls 2, 3, 5, 6 are mounted in a known manner by their respective end journals 7, 8 in the posts S1, S2 of the roll stand 1 respectively in mountings on rolling bearings.

Figure 2:
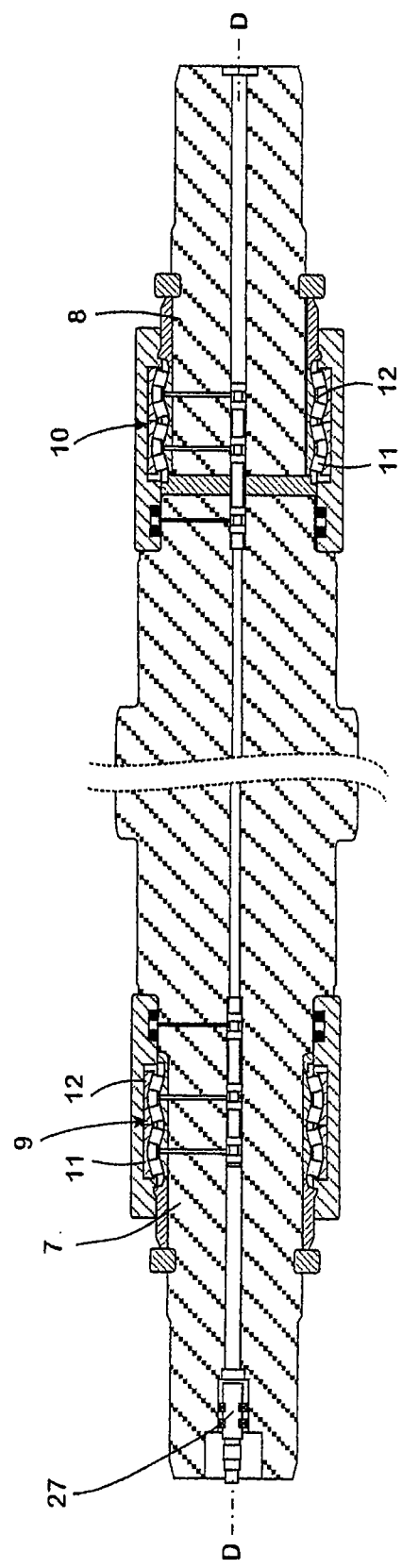
FIG. 2 is a longitudinal sectional view of a roll used in the roll stand shown in FIG. 1.
Figure 3:
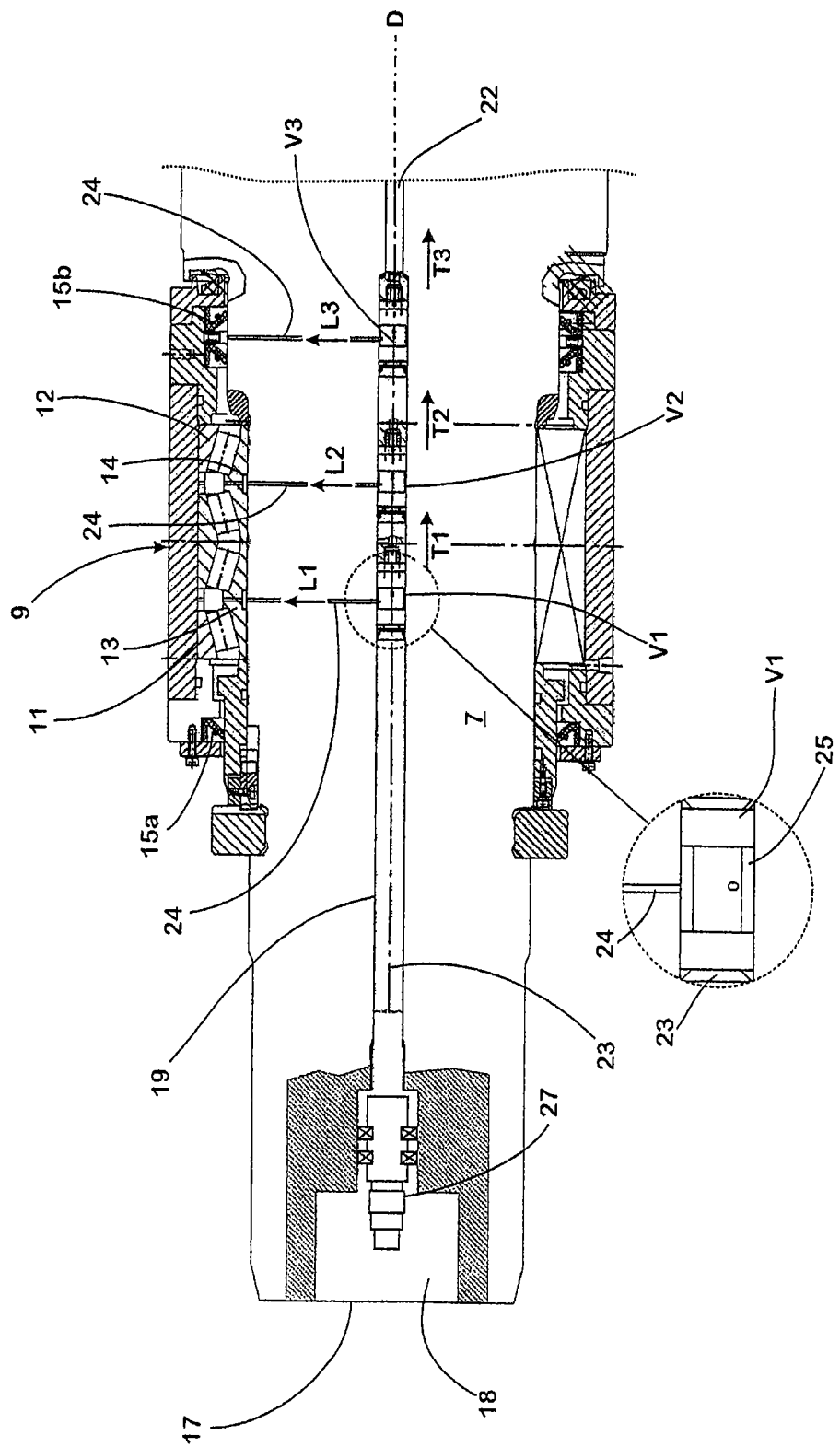
FIG. 3 is an enlarged partially sectional view of one end journal of the working roll shown in FIG. 2.
Figure 4:
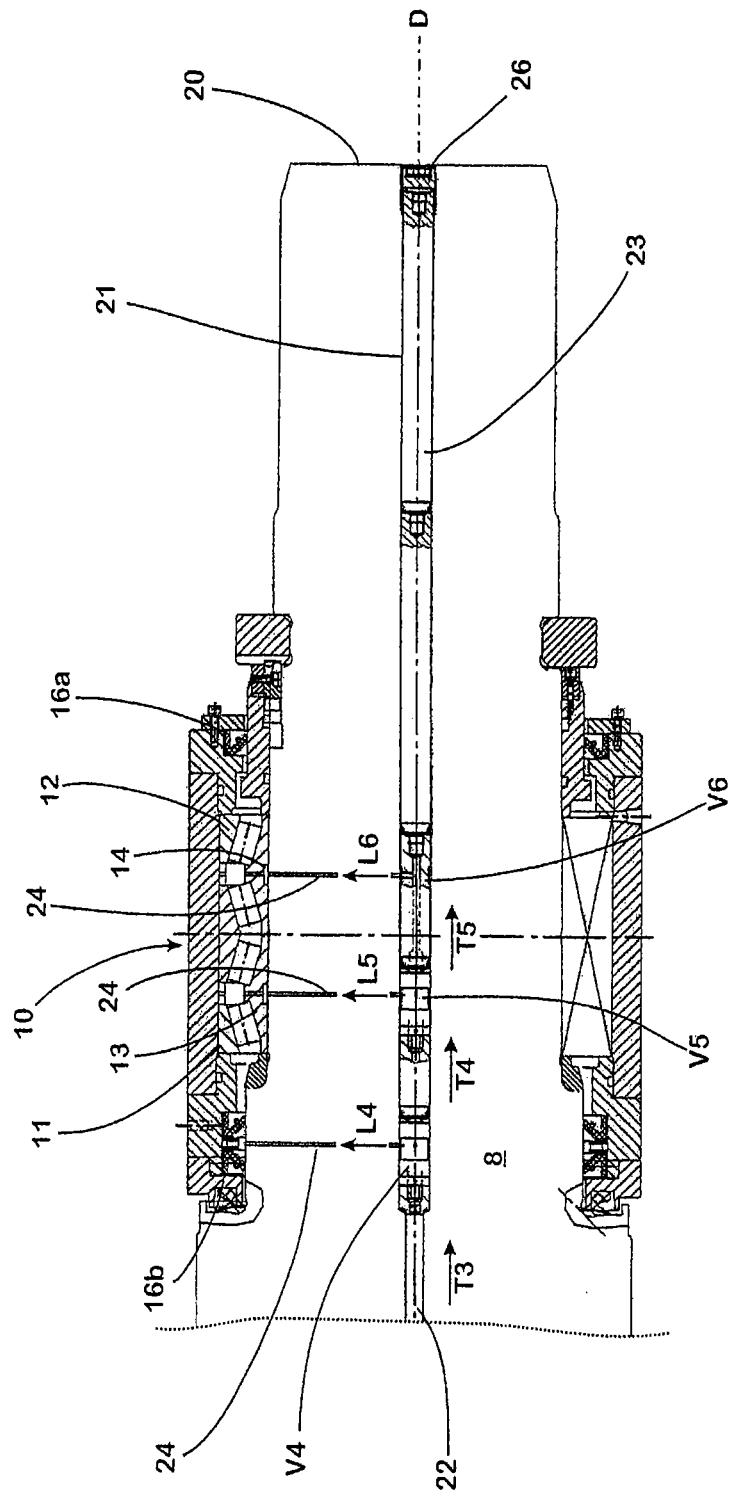
FIG. 4 is an enlarged partially sectional view of the other end journal of the working roll shown in FIG. 2.

In the working roll shown in FIGS. 2-4, each of the respective mountings on rolling bearings 9, 10 is formed likewise in a known manner by respectively two large double-cone roller bearings 11, 12. Molded into the inner circumferential surface of the inner bearing ring 13 of these tapered roller bearings 11, 12 is in each case an inner circumferential groove 14, from which passage openings which are directed in a radial direction and are distributed in regular angular spacings around the rotational axis of the bearings lead to the running surface of the respective bearing ring 13. As an alternative or in addition, correspondingly positioned and configured circumferential grooves can also be molded in the respective end journals 7, 8 of the working roll 2.

The rolling bearings are sealed from the surroundings by means of conventional shaft seals 15a, 15b, 16a, 16b. In this respect, the shaft seals 15a, 15b, 16a, 16b are configured such that they prevent lubricant building up under pressure in the tapered roller bearings 11, 12 from escaping.

Molded into the end face 17 of the end journal 7 associated with the operating side B is a recess 18 in which is centrally positioned the inlet opening of a seat 19 also formed in the end journal 7 as a cylindrical bore. The depth of the seat 19 is calculated such that it extends into the end journal 7 over the shaft seal 15b, associated with the inside I of the roll stand 1.

Correspondingly, starting from the end face 20 of the drive-side end journal 8, a seat 21 is molded into the end journal 8. Said seat 21 extends into the end journal 8 over the shaft seal 16b, associated with the inside I of the roll stand 1, of the mounting on rolling bearings 10.

The seats 19, 21 are interconnected by a connecting channel 22 which extends coaxially to the rotational axis D of the working roll 2. The connecting channel 22 can be formed, for example by two deep bores which are each made in the working roll 2 starting from the respective end face 17 and 20. The diameter of the connecting channel 22 can be smaller than the diameter of the seats 19, 21, such that a shoulder is formed in the transition region of the seats 19, 21 and it can be used to position the construction elements to be inserted into the seats 19, 21.

Positioned in the seats 19, 21 are respectively three devices V1, V2, V3 and respectively V4, V5, V6 for distributing a lubricant-gas flow to the respective rolling bearings 9, 10 and to the respective internal shaft seals 15b, 16b. The devices V1-V6 are respectively configured according to the prior art described in detail in EP 0 902 868 B1, reference being made thereto in this respect.

Allocated to each tapered roller bearing 11, 12 is one of the devices V1, V2 or V5, V6. The respective internal shaft seals 15b and 16b are supplied in the same way with the required lubricant-gas flow by means of a respective device V3 and V4.

The devices V1-V6 configured thus in a known manner each have a cylindrical housing, the diameter of which corresponds to the internal diameter of the seats 19, 21, except for a slight undersize, such that the devices V1-V6 can easily be inserted into the seats 19, 21. Annular seals (not shown here) which rest against the inner surfaces of the respective seat 19, 21 seal an outer circumferential groove, respectively formed in the central portion of the housing, from the other longitudinal portions of the respective seat 19, 21. Opening in the circumferential groove are the discharge lines (also not shown here) of the respective devices V1-V6, via which the lubricant-gas flow allocated to the respectively associated tapered roller bearing 11, 12 or the associated shaft seal 15b, 16b issues from the respective device V1-V6.

Tubular inserts 23 are used to position the devices V1-V6 such that they are aligned centrally to the respective tapered roller bearing 11, 12 or the respective shaft seal 15b, 16b. In this region, a respective radially aligned discharge line 24 leads from the respective seat 19, 21 to the circumferential surface of the respective end journal 7, 8. In this arrangement, the connecting bores 24 are on the one hand positioned such that they open in the region of the respective inner circumferential groove 14 of the inner rings 13 of the tapered roller bearings 11, 12. On the other hand, their inlet opening is respectively aligned in the region of the respective seat 19, 21 such that it is connected to the annular space 25 respectively formed by the circumferential groove in the devices V1-V6 in the respective seat 19, 21.

The seat 21 associated with the drive side A is tightly sealed by a stopper 26, such that the position of the distributing devices V4-V6 is fixed in the seat 21 by the respective inserts 23 and lubricant or gas distributed by the distributing devices V4-V6 is reliably prevented from escaping.

On the other hand, positioned in the recess 18 in the end journal 7 associated with the operating side B is a commercially available rotation-uncoupled connection 27 for a supply line 28, via which the lubricant-gas flow L to be distributed is guided into the seat 19.

In the embodiment described here, the gas flow for advancing the lubricant to be distributed is compressed air which is required in the surroundings of the roll stand 1, for example to drive other pneumatically operated aggregates (not shown here) and is supplied by a compressed air line 29.

The lubricant used here is likewise a commercially available oil, the viscosity of which is sufficient for the respective lubrication task. The oil is supplied via an oil supply line 30 from a stock (not shown).

The supply line 28 is connected to a feed device 31 in which an air flow taken from the compressed air line 29 and a lubricant flow taken from the oil supply line 30 are fed into the supply line 28. The introduction takes place in a known manner such that the air flow flows turbulently in the supply line and also in all lines, connected thereto, of the working roll 2 and distributing devices V1-V6, without lubricating oil and air mixing together. In this way, the air flow drives the lubricant adhering to the internal surfaces of the supply line 28 and the respective other lines of the working roll 2 to the lubrication points of the rolling bearings 9, 10 which are to be respectively supplied with lubricant.

Branching off from the oil-air flow L arriving thus at the first distributing device V1 is a first partial flow L1 which passes through the first discharge line 24 to the inner circumferential groove 14 in the first tapered roller bearing 11 of the mounting on rolling bearings 9 and is distributed from there via the passage bores in the tapered rolling bearing 11 which are molded in the inner ring 13 of the tapered rolling bearing 11. A substantially greater second partial flow T1 is simultaneously allocated by the distributing device V1 to the second distributing device V2.

The second distributing device V2, like the distributing device V1, divides off from the partial flow T2 allocated thereto a partial flow L2 which is guided via the discharge line 24 associated therewith in the same way as described for the tapered roller bearing 11, into the tapered roller bearing 12 of the mounting on rolling bearings 9. At the same time, the distributing device V2 allocates a substantially greater partial flow T2 to the distributing device V3.

The distributing device V3 divides off from this partial flow T2 a very small lubricant-air partial flow L3 which is guided into the internal shaft seal 15b via the discharge line 24 associated therewith. The function of the lubricant guided into the shaft seal 15b is to reduce to a minimum the friction prevailing between seal and outer surface of the end journal 7. At the same time, the distributing device V3 guides a substantially greater partial flow T3 into the connecting channel 22, via which said flow T3 arrives at the distributing device V4.

The distributing device V4 in turn divides off from this partial flow T3 a very small lubricant-air partial flow L4 which is guided into the internal shaft seal 16b via the discharge line 24 associated therewith. At the same time, the distributing device V4 guides a substantially greater partial flow T4 to the distributing device V5.

Like the distributing devices V1 or V2, the fifth distributing device V5 divides off from the partial flow T4 allocated thereto a partial flow L5 which is guided into the tapered roller bearing 11 of the mounting on roller bearings 10 via the discharge line 24 associated therewith in the same way as described for the tapered roller bearing 11 of the mounting on roller bearings 9. At the same time, the distributing device V5 allocates a substantially identical partial flow T5 to the distributing device V6.

Unlike the distributing devices V1-V6, the distributing device V6 does not have to divide up the partial flow T5 arriving at said device V6, but merely serves to feed the partial flow T5 as partial flow L6 to the tapered roller bearing 12 of the mounting on roller bearings 10.

Figure 5:
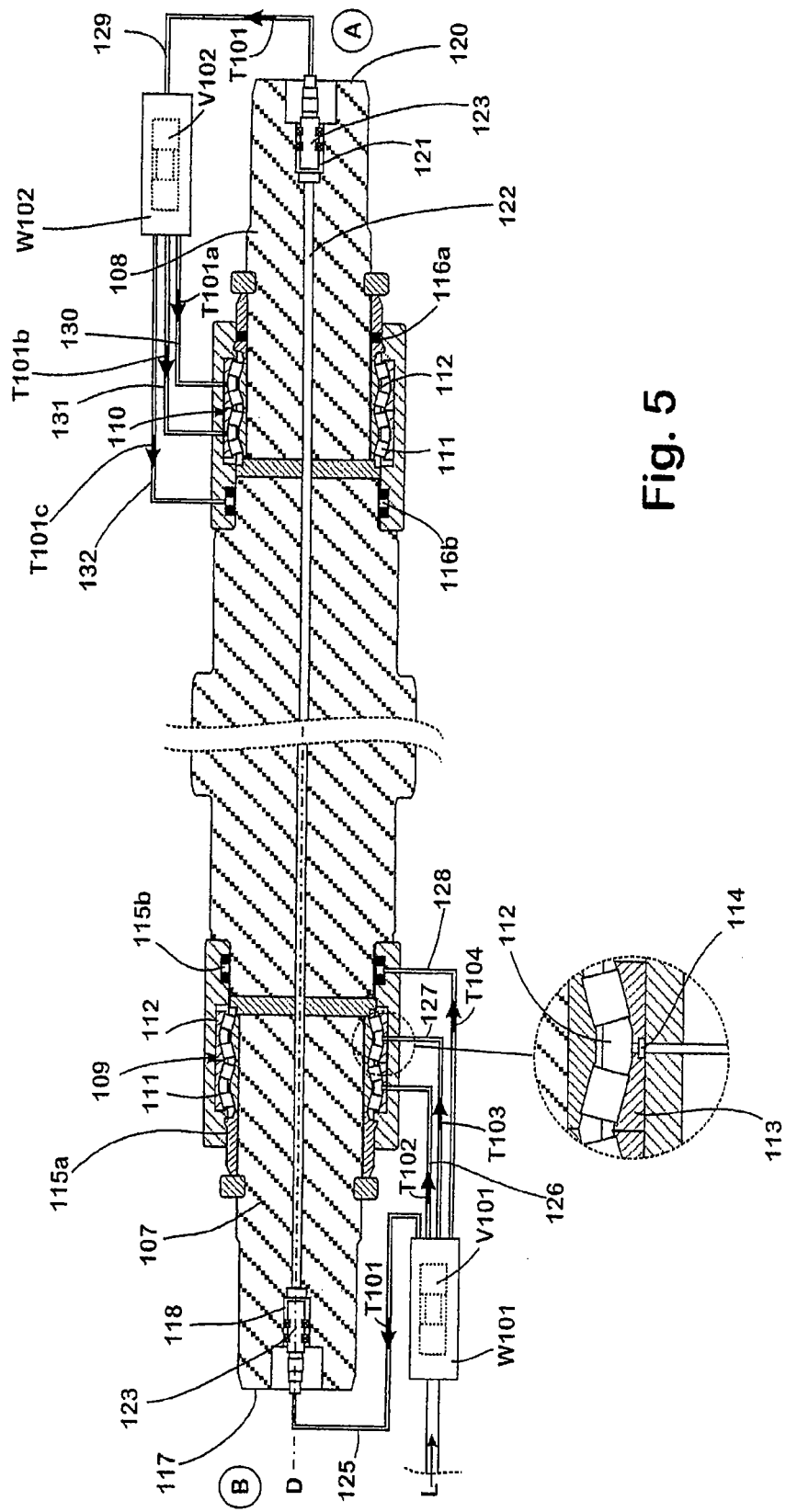
FIG. 5 shows another embodiment of the working roll in an illustration corresponding to FIG. 2.

In the working roll shown in FIG. 5 as well, the end journals 107, 108 are mounted in mountings on roller bearings 109, 110, as in the case of the working roll shown in FIGS. 2 to 4, said mountings 109, 110 each being formed by two tapered roller bearings 111, 112.

However, in this embodiment, there is respectively molded in the outer bearing ring 113 of the tapered roller bearings 111, 112 a respective circumferential groove 114, from which lead passage openings which are directed in a radial direction and are distributed in uniform angular spacings around the rotational axis of the bearings, to the inner running surface of the respective bearing ring 113. As an alternative or in addition, correspondingly positioned and configured grooves could also be molded into the housing surrounding the respective tapered roller bearings 111, 112. The tapered roller bearings 111, 112 are respectively sealed by shaft seals 115a, 115b, 116a, 116b in the manner described above for the working roll shown in FIGS. 2-4.

Molded into the end face 117 of the end journal 107 associated with the operating side B is a recess 118 positioned centrally on the end face 117. In the same manner, a recess 121 positioned centrally on the end face 120 is configured in the end face 120 of the end journal 108 associated with the drive side A.

The recesses 118, 121 are interconnected by a connecting channel 122 which extends coaxially to the rotational axis D of the working roll and has been molded into the working roll in the manner described above for the connecting channel 122.

A respective commercially available rotation-uncoupled connection 123, 124 is positioned in the recesses 118, 121. Connected to the connection 123 positioned in the recess 118 and associated with the operating side B is a connecting line 125, via which a lubricant-air flow T5 is guided into the connecting channel 122.

The connecting line 125 is connected at its other end to an outlet of a distributor W101. The distributor W101 has four such outlets and one inlet, via which the lubricant-air flow L to be divided up flows into the distributor W101. In this respect, the distributor W101 comprises a distributing device V101 which, for the sake of clarity, has merely been indicated and is configured like the distributing devices V1-V6 according to the prior art described in detail in EP 0 902 868 B1.

The distributing device V101 is positioned in a housing of the distributor W101, into which housing are molded channels (not shown here) which lead from the discharge openings in the distributor device to a respective one of the outlets.

Connected to the connections, not occupied by the connecting line 125, of the distributor W101 is a respective further connecting line 126, 127, 128, of which one connecting line 126 leads to the tapered roller bearing 111 and the connecting line 127 leads to the tapered roller bearing 112 of the mounting on rolling bearings 109, while the connecting line 128 connects the shaft seal 115b to the distributor W101. The connecting lines 126, 127 open in the circumferential groove in the respective outer bearing ring 113 of the tapered roller bearings 111, 112. The connecting line 128 is guided in a corresponding manner from a radially outer direction to the shaft seal 115b.

The distributing device 101 divides the lubricant-air flow L into four partial flows T101, T102, T103, T104. In this respect, the partial flows T102-T104 are proportioned in each case such that the tapered roller bearings 111, 112 of the mounting 109 and the shaft seal 115b is supplied with an exactly metered, adequate amount of lubricant.

The partial flow T101 flowing through the connecting channel 122 up to the connection 123 positioned on the operating side B in the end journal 108 is, however, calculated such that it is sufficient to supply both the tapered roller bearings 111, 112 of the mounting 110 as well as the shaft seal 116b with lubricant.

Connected to the connection 123 is a connecting line 129 which leads to the inlet of a further distributor W102 which is likewise secured to one of the outer surfaces of the roll stand 1.

The distributor W102 is basically constructed in the same manner as the distributor W101. Its distributing device V102 divides up the partial flow T101 supplied to it via the connecting line 129 into three further sub-partial flows T101a, T101b, T101c, of which, the sub-partial flows T101a, T101b are allocated to the tapered roller bearings 111, 112 of the mounting 110 and the sub-partial flow T101c is allocated to the shaft seal 116b by means of a respective connecting line 130, 131, 132.

In the embodiment shown in FIG. 5, the connecting channel 122 thus makes it possible for the two distributors W101 and W102 to be connected in an operationally reliable manner to the distributing devices V101, V102, without the need for lines which lead around the roll stand 1 or which are expensive to install in the roll stand 1.

LIST OF REFERENCE NUMERALS 1 roll stand
11, 12, 111, 112 large tapered roller bearings
13 inner bearing ring of tapered roller bearings 11, 12
14 inner circumferential groove
15a, 15b shaft seals
16a, 16b shaft seals
17 end face of end journal 7
18, 118, 121 recess
19, 21 seat
2, 3 working rolls
20 end face of end journal 8
22, 122 connecting channel
23 inserts
24 discharge line
25 annular space
26 stopper
27 connection for supply line 28
28 supply line
29 compressed air line
30 oil supply line
31 feed device
4 roll gap
5, 6 back-up roll
7, 8, 107, 108 end journals
9, 10, 109, 110 mountings on rolling bearings
113 outer bearing ring of tapered roller bearings 111, 112
114 circumferential groove
115b, 116b shaft seals
117 end face of end journal 107
120 end face of end journal 108
123, 124 rotation-uncoupled connections
125-132 connecting line
A "drive side" of roll stand 1
B "operating side" of roll stand 1
D rotational axis of working roll 2
G drive transmission
I inside of roll stand 1
L1-L6 partial flows of lubricant-gas flow L
M drive motor
S1, S2 posts of roll stand 1
T1-T5 partial flows of lubricant-gas flow L
T101a-T101c sub-partial flows
T101-T104 partial flows
V1-V6 devices for distributing a lubricant-gas flow L
V101, V102 distributing devices
W101, W102 distributors

The invention claimed is:

1. Roll or cylinder for a roll stand, comprising a first end journal associated with an operating side of the roll stand and a second end journal associated with a drive side of the roll stand, wherein in the roll or cylinder:

a first rolling bearing rotatably mounted on a circumferential surface of the first end journal and a second rolling bearing rotatably mounted on a circumferential surface of the second end journal;

at least one seat is provided, wherein the at least one seat includes a first seat at the first end journal, in which first seat a first distributing device is inserted for distributing lubricant-gas flow to at least a first discharge line, said first discharge line being also provided within the roll or cylinder, said first discharge line leading to the first rolling bearing mounted on the circumferential surface of the first end journal of the roll or cylinder; and a connecting channel is provided for transporting the lubricant-gas flow from the first distributing device to a second discharge line leading to the second rolling bearing mounted on the circumferential surface of the second end journal, said first distributing device being connected to the connecting channel.

2. Roll or cylinder according to claim 1, wherein the first seat is molded into the first end journal.

3. Roll or cylinder according to claim 1, wherein the first seat for the first distributing device is molded into the first end journal, and wherein a second seat for a second distributing device is molded into the second end journal, wherein the second distributing device distributes lubricant-gas flow from the connecting channel to the second discharge line.

4. Roll or cylinder according to claim 3, wherein the first seat of the first end journal is interconnected by the connecting channel leading through the roll or cylinder to a second seat of the second end journal.

5. Roll or cylinder according to claim 4, wherein the connecting channel is aligned coaxially to the axis of rotation of the roll or cylinder.

6. Roll or cylinder according to claim 4, wherein the connecting channel is produced by two mutually joining bores, one of which is molded into the roll or cylinder from a first end face of the first end journal and the other is molded into the roll or cylinder from the second end face of the second end journal.

7. A roll stand for rolling metallic strips comprising at least one roll or cylinder of claim 1, which is respectively mounted in a mounting on rolling bearings in the region of its end journals, and comprising at least one distributing device for distributing a lubricant-gas flow.

8. A roll or cylinder for a roll stand, comprising:
a first end journal associated with an operating side of the roll stand and a second end journal associated with a drive side of the roll stand;
a first rolling bearing rotatably mounted on a circumferential surface of the first end journal and a second rolling bearing rotatably mounted on a circumferential surface of the second end journal;
at least one seat extending into the roll or cylinder for flowing a lubricant-gas therethrough, wherein the at least one seat includes a first seat extending into the roll or cylinder at the first end journal associated with the operating side of the roll stand;
a first discharge line leading to the first rolling bearing mounted on the circumferential surface of the first end journal;
a second discharge line leading to the second rolling bearing mounted on the circumferential surface of the second end journal;
a connecting channel that connects the first seat with the first discharge line at the first end journal and with the second discharge line at the second end journal; and
a first distributing device inserted into the first seat, wherein the first distributing device divides the flow of the lubricant-gas into a first partial flow and a second partial flow and distributes the first partial flow to the first discharge line,
wherein at least a portion of the second partial flow is distributed to the second discharge line.

9. The roll or cylinder of claim 8, further comprising a second distributing device inserted into at least one seat, wherein the second distributing device divides the second partial flow from the first distributing device into a third partial flow and a fourth partial flow and distributes the third partial flow to the second discharge line.

10. The roll or cylinder of claim 9, further comprising:
a third discharge line leading to a circumferential surface of at least one of the first and second end journals; and
a third distributing device inserted into at least one seat, wherein the third distributing device divides the fourth partial flow from the second distributing device into a fifth partial flow and a sixth partial flow and distributes the fifth partial flow to the third discharge line.

11. The roll or cylinder of claim 9, wherein a second distributing device is inserted into a second seat, and wherein the connecting channel connects the first seat with the second seat.

12. The roll or cylinder of claim 9, wherein the first and second distributing devices are inserted into the first seat.

13. The roll or cylinder of claim 8, wherein the first distributing device has a cylindrical housing, the diameter of which corresponds to the internal diameter of the seat.

14. The roll or cylinder of claim 8, wherein the at least one seat is formed in the first or second end journal as a cylindrical bore in an axial direction of the roll or cylinder.

15. The roll or cylinder of claim 8, wherein the first seat is molded into an end face of the first end journal and a second seat is molded into an end face of the second end journal.

16. The roll or cylinder of claim 8, wherein the first and second discharge lines are radially aligned with respect to the axial direction of the roll or cylinder.

17. The roll or cylinder of claim 8, wherein the connecting channel connects the first seat formed in the first end journal with a second seat formed in the second end journal.

18. The roll or cylinder of claim 17, wherein a diameter of the connecting channel is smaller than the diameter of the first and second seats such that a shoulder is formed.

19. The roll or cylinder of claim 18, wherein the shoulder is used to position the first distributing device.

20. The roll or cylinder of claim 8, wherein a tubular insert is used to position the first distributing device.

* * * * *